(12) United States Patent
Dimitrova et al.

(10) Patent No.: US 7,734,144 B2
(45) Date of Patent: Jun. 8, 2010

(54) METHOD AND APPARATUS FOR EDITING SOURCE VIDEO TO PROVIDE VIDEO IMAGE STABILIZATION

(75) Inventors: Nevenka Dimitrova, Yorktown Heights, NY (US); Radu S. Jasinschi, Nuenen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1492 days.

(21) Appl. No.: 10/284,219

(22) Filed: Oct. 30, 2002

(65) Prior Publication Data

US 2004/0085340 A1  May 6, 2004

(51) Int. Cl.
*H04N 5/93*    (2006.01)
*G11B 27/00*   (2006.01)
*H04N 5/91*    (2006.01)
*H04N 5/00*    (2006.01)
*H04N 5/14*    (2006.01)

(52) U.S. Cl. .............................. 386/52; 386/67; 386/68; 386/69; 386/70; 386/117; 348/700; 348/701; 348/702

(58) Field of Classification Search ......... 348/700–702; 386/67–70, 52, 117
See application file for complete search history.

(56) References Cited

U.S. PATENT DOCUMENTS

| | | | | |
|---|---|---|---|---|
| 6,125,229 A | | 9/2000 | Dimitrova et al. | 386/69 |
| 6,137,544 A | | 10/2000 | Dimitrova et al. | 348/700 |
| 6,154,600 A | | 11/2000 | Newman et al. | 386/4 |
| 6,469,711 B2 | * | 10/2002 | Foreman et al. | 715/723 |
| 6,748,158 B1 | * | 6/2004 | Jasinschi et al. | 386/69 |
| 2003/0202780 A1 | * | 10/2003 | Dumm et al. | 386/112 |
| 2004/0239817 A1 | * | 12/2004 | Jain et al. | 348/722 |

OTHER PUBLICATIONS

Zhigang zhu et al "Camera Stabilization Base on 2.5 D motion Estimation and interial Motion Filtering" pp. 329-334 1998 IEEE International Conference on Intelligent Vehicles (Oct. 28-30, 1998 Sttttgart, Germany.*

Zhigang Zhu et al. "Camera Stabilization Based on 2.5D Motion Estimation and Inertial Motion Filtering" pp. 329-334 1998 IEEE International Conference on Intelligent Vehicles (Oct. 28-30, 1998 Stuttgart, Germany).

Morimoto et al. "Fast Electronic Digital Image Stabilization for Off-Road Navigation" Proc. Of IEEE International Conference on Pattern Recognition, Vienna, Austria, Aug. 1996 pp. 1-28.

(Continued)

*Primary Examiner*—Thai Tran
*Assistant Examiner*—Daquan Zhao

(57) ABSTRACT

A method and apparatus for editing a source video that has already been taken to stabilize images in the video. To eliminate jerky motion from a video, changes in shots are first detected. Then, any jerkiness within the video of that shot is classified and the video is segmented further into smaller segments based on this classification. The jerkiness within the selected segments is removed. The corrected shot, comprising a plurality of frames, is then added to the preceding shot until all shots of the video have been appropriately corrected for jerkiness. To help the user identify the shots being edited, keyframes or snapshots of the shots are displayed, thereby allowing the user to decide whether processing of the shot is desired and which shots should be incorporated into the final video.

24 Claims, 2 Drawing Sheets

OTHER PUBLICATIONS

R.J. Jasinschi et al. "Camera Motion Descriptor" International Organisation for Standardisation Organisation Internationale De Normalisation ISO/IEC/JTC1/SC29/WC11 Coding of Moving Pictures and Audio pp. 1-21 Mar. 9, 1999.

"Detection and Removal of Lighting & Shaking Artifacts in Home Videos", W.Q. Yan et al, XP-001174979.

R.S. Jasinchi et al. "Video Scouting: an Architecture and System for the Integration of Multimedia Information in Personal TV Applications", Proceedings of International Conference on Acoustics, Speech, and Signal Processing, Salt Lake City, May 2001.

R.S. Jasinchi et al. "Integrated Multimedia Processing for Topic Segmentation and Classification", Proc. Of IEEE ICIP 2001, Thessaloniki, Greece, Oct. 2001 pp. 366-369.

Morimoto et al. "Automatic Digital Image Stabilization", IEEE International Conference on Pattern Recognition, Aug. 1996.

* cited by examiner

METHOD AND APPARATUS FOR EDITING SOURCE VIDEO TO PROVIDE VIDEO IMAGE STABILIZATION

FIELD OF THE INVENTION

The present invention relates to a method and apparatus for editing source video.

BACKGROUND OF THE INVENTION

People currently use video editor programs to edit an existing source video to create personalized videos, for example, home movies that contain only the portions of one or more videos of interest to the user. The video editor program attaches user-selected portions of frames or images to other frames or images to create an edited or personalized video.

Although the video editing process provides flexibility for users to edit existing video and create new videos therefrom, the process is typically time-consuming and frustrating. Images captured on the video often appear jittery or jerky because the camera was in motion while the video was originally made. This camera motion causes the images in the frames of the video to exhibit uneven or jerky motion and uneven zoom when the captured image is zoomed in on.

Current video appliances, for example, camcorders and personal video recorders, can, to some extent, stabilize images while the video is originally being taken and can locate objects within shots while the video is being taken. However, these features are currently not implemented in video editor programs which operate on videos that have already been taken. Thus, if a video was originally taken with a video recorder that did not have the capability of removing camera jitter from the recorded video or the capability of allowing for jitterless zooming while the video is being taken, it is very difficult subsequently to remove these imperfections from the video.

SUMMARY OF THE INVENTION

The present invention is directed to a method and apparatus for editing a source video that has already been taken to stabilize images in the video. In accordance with the present invention, to eliminate jerky motion from a video, changes in shots are first detected. Then, any jerkiness within the video of that shot is classified. If the shot has more than one classification of jerkiness, the shot is segmented further into smaller segments, if possible, so that each segment has a single type of jerkiness. If any segment is longer than a predetermined threshold length, the segment is broken into shorter segments. The jerkiness within each segment is then removed. The corrected segment, each comprising a plurality of frames, is then added to the preceding segment until all segments of the video have been appropriately corrected for jerkiness. To help the user identify the segments being edited, keyframes or snapshots of the segments are displayed, thereby allowing the user to decide whether processing of the segment is desired and which segments should be incorporated into the final video.

The video processing system of the present invention comprises a video source, an intelligent video editor, an input device, a display, and a storage device. The video source provides the video to be edited. The input device receives commands from a user and transmits them to the intelligent video editor. The intelligent video editor receives the video to be edited from the video source and processes the input video in accordance with a video processing program stored in memory of the intelligent video editor and in accordance with instructions received from the user through the input device. The electronic video signal from the intelligent video editor is transmitted to the display for display to the user. The storage device stores the video after it has been edited in a storage media.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and, that, unless otherwise indicated, they are merely intended to conceptually illustrate the structures and procedures described herein.

BRIEF DESCRIPTION OF THE DRAWINGS

In the drawings, wherein like reference numerals delineate similar elements.

DETAILED DESCRIPTION OF THE PRESENTLY PREFERRED EMBODIMENTS

Figure 1:
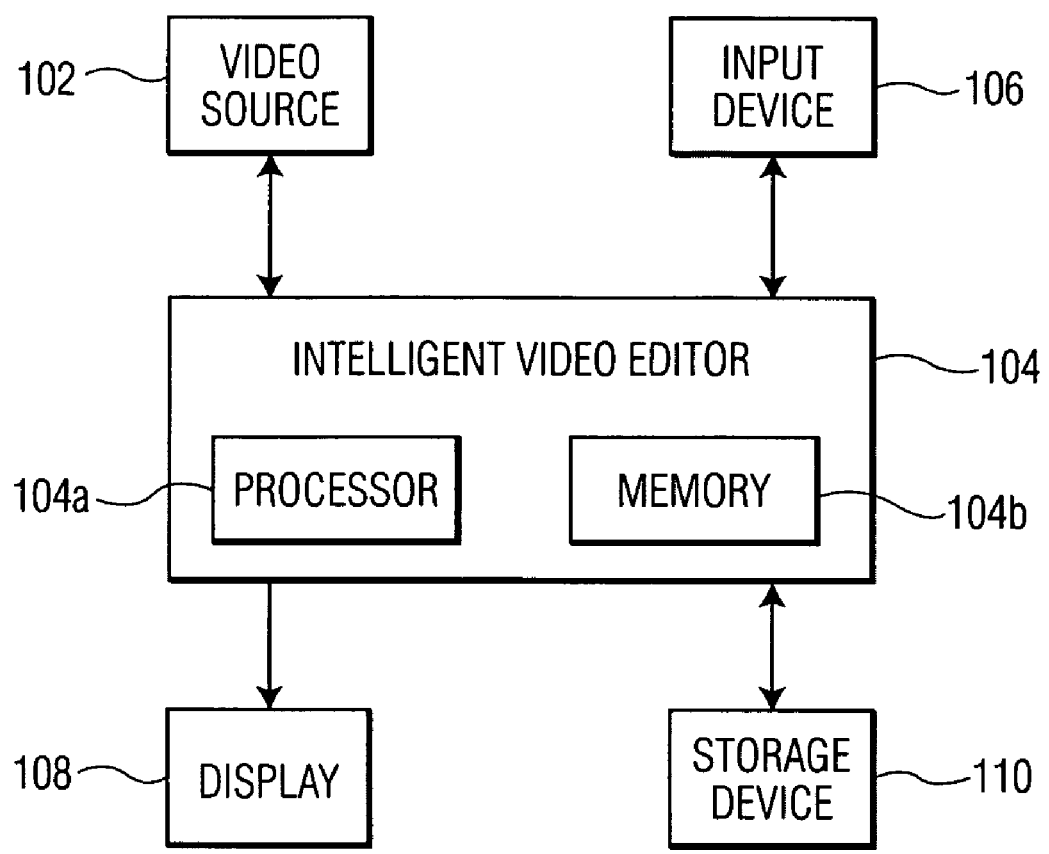
FIG. 1 is a block diagram a video processing system of the present invention.

FIG. 1 depicts a video processing system of the present invention comprising a video source 102, an intelligent video editor 104, an input device 106, a display 108, and a storage device 110. The video source 102 provides the video to be edited, and may be any of a plurality of sources, such as, for example, a camcorder, a VCR, a DVD player, a personal computer, a computer network, the internet, or a handheld device, such as a mobile phone wirelessly connected to a network and to the video processing system.

The input device 106 receives commands from a user and transmits them to the intelligent video editor 104. The input device 106 may be, for example, a remote control, a keyboard, a mouse, a personal digital assistant, or a mobile phone. The input device 106 is either hardwired connected or wirelessly connected to the intelligent video editor 104. The intelligent video editor 104 receives the video to be edited from the video source 102. The processor 104a of the intelligent video editor 104 processes the input video in accordance with a video processing program stored in memory 104b and in accordance with instructions received from the user through the input device 106. Memory 104b may also be used to temporarily store the input video signal until editing has been complete for download to storage device 110. Although processor 104a is shown as only including one processor and one memory, alternatively, it may be comprised of a plurality of devices or modules, each with its own function. The intelligent video editor 104 may be located proximate the user as either a dedicated hardware device (such as a set top box), as a module removably connectable to other user devices, or as software running on a data processing device or computer. Alternatively, the intelligent video editor 104 may be located remote from the user on a remote server accessible to the user through a telephone, cable, mobile phone or satellite connection, or through the Internet. The electronic video signal from the intelligent video editor 104 is transmitted to the display 108 for display to the user. The display 108 may be a computer monitor, a television, or any other type of device having a display, such as a camcorder, a mobile phone, a personal digital assistant, etc. The storage device 110 stores the video after it has been edited in a storage medium. The storage device 110 may, for example, be a VCR storing the edited video on video tape, a computer hard drive (located locally proximate the intelligent video editor 104 and display 108, or located remotely on a server connected to the video editor 104), a DVD or CD writer which stores the edited video on a DVD or CD, or any other type of data storage device.

In accordance with the present invention, to eliminate jerky motion from a video, gradual and abrupt changes or transitions in the video are first detected, i.e., individual shots are identified. In the literature, such abrupt transitions are generally called "cuts". Gradual shot changes in a video can be of several types: dissolves, fades (in and out), flips, or any type of special effect. Then, any jerkiness within the video of that shot is detected. If a shot has more than one type of jerkiness, the shot is segmented, if possible, so that each segment has one type of jerkiness. If any segment is particularly long, that is, its length is greater than a predetermined or user selected threshold length (such as, for example, 30 seconds), the segment is optionally further segmented. The segments are then classified in accordance with the type of jerkiness. Long shots occur frequently in personal home video that typically can last for many minutes. For example, a video camera may be static at a birthday party for a relatively long period of time, then the user films while walking around. In this example, there are two segments: a static segment and a shaky segment (i.e., filming while the user is walking). Using known image stabilization algorithms, as discussed below, the jerky motion is then removed for selected segments. The corrected segment, comprising a plurality of frames, is then added to the preceding segment until an entire video has been appropriately corrected for jerkiness.

Figure 2:
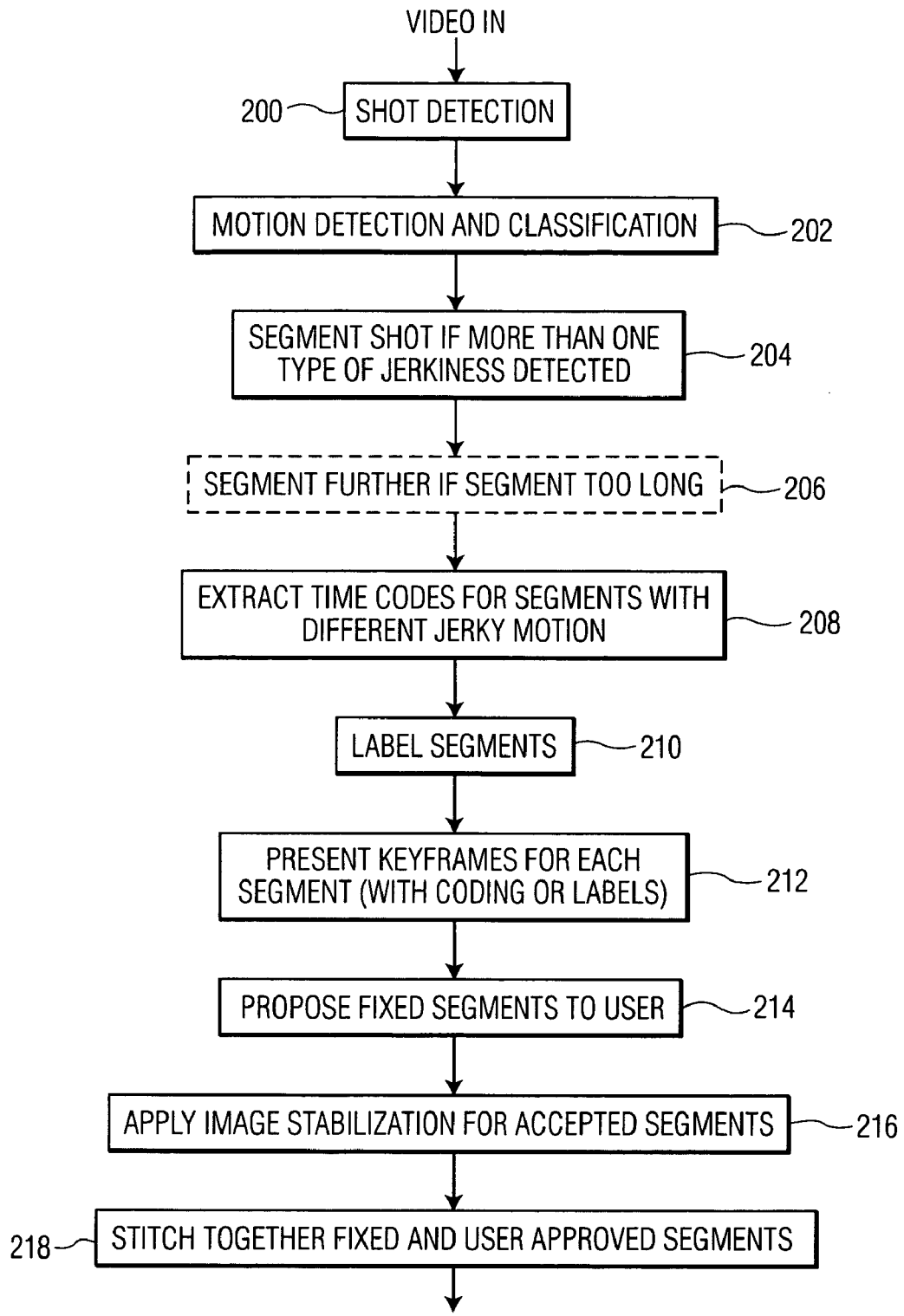
FIG. 2 is a flow chart of an embodiment of video editing using the video processing system of the present invention.

FIG. 2 shows a flow chart of an embodiment of video editing using the intelligent video editor 104 of the present invention. When video is initially received by the intelligent video editor 104, individual shots are initially identified, step 200. A shot change or cut occurs when a succeeding frame of the video is significantly and substantially different from its immediately preceding frame. For example, if a video initially shows a landscape for a number of frames then changes to a close-up portrait image of a face, the video would be considered to have undergone a "cut". However, if a video initially shows a landscape and zooms in to a portrait image of a face, that video would not have a cut since each frame would be similar to its immediate preceding frame. Determination of a cut is accomplished by comparing one frame of the video with the next succeeding frame of the video. If certain aspects of a frame are similar to similar aspects of the next succeeding frame (for example, if there are a great number of instances where the same portions of the two frames have the same color), a cut has not been located. In addition, two frames can be compared using other features (e.g., texture, shape, edges) or objects (e.g., presence of faces, video text, vehicles, etc.). However, if certain aspects of a frame do not appear in the succeeding frame of the video, then there has been a cut. Such an analysis of video to determine cuts is disclosed in U.S. Pat. No. 6,137,544, the entirety of which is incorporated herein by reference. That patent discloses the use of decomposition of a frame using the Discrete Cosine Transform to derive a representation of the frames that enables effective comparison. While video frames are being analyzed to identify or locate a cut in the video, the video may be stored in a buffer in the memory 104b of the video editor 104 for subsequent editing. Alternatively, the frames within the same shot need not be stored in memory but may be marked to indicate that they are all part of the same shot.

Once the beginning and end of a shot in the video has been identified (a shot being defined as the part of the video between two cuts), the shot is then analyzed, step 202, to identify what jerky motion, if any, is detected. Jerky motion of the images in the frames of the video are caused, for example, when the user of the camera has shaken or moved the camera while originally recording the scene. The jerky motion includes inconsistent zooms, shaky pans, and shaky static scenes. An inconsistent zoom occurs when the camera zooms in or out on a subject but does so at an uneven pace. A shaky pan occurs when the camera pans across a landscape, for example, but shakes during the panning movement of the camera. A shaky static scene occurs when the camera shakes while the camera is centered on a subject. These different types of jerky motion in the video scene are determined by comparing successive frames within the scene.

There are many algorithms reported in the literature that are useful for image stabilization. For example, in the method described in *Fast Electronic Digital Inage Stahilization*, Carlos Morimoto et al., IEEE International Conference on Pattern Recognition, Vienna, Austria, August 1996, pages 1-28, a small set of features are tracked and the movement of the camera is estimated between consecutive frames. Stabilization is achieved by combining all motion from a reference frame and warping the current frame back to the reference. Another method of image stabilization is disclosed in *Camera Stabilization on 2.5D A motion Estimation and Internal Motion Filtering*, Zhigang Zhu et al., IEEE International Conference on Intelligent Vehicles (Stuttgart, Germany), Oct. 28-30, 1998, pages 329-334. According to that method, using a 2.5D motion model, image velocities of representative points are first estimated by a pyramid-based matching algorithm by comparing two consecutive images and Finding an image velocity for small blocks in the image frame. Based upon the image velocities, the type of motion of the camera is then determined (e.g. dolly, h-tracking, v-tracking). Using a generic inertial model unwanted high frequency vibrations are then removed to achieve image stabilization. The differences between the smoothed motion parameters and original estimated motion parameters can be used to compensate the images in order to obtain the stabilized image sequence.

If a shot has more than one type of jerkiness, the shot is segmented, if possible, so that each segment has one type of jerkiness, step 204. If any segment is particularly long, that is, its length is greater than a predetermined or user selected threshold length (such as, for example, 30 seconds), the segment is optionally further segmented, step 206.

Each shot in which jerky motion is detected, and possibly also those shots with no detected jerky motion, are then analyzed to generate a keyframe of that segment. A keyframe is a video frame within the shot which is representative of the video in that shot. This keyframe can be the first frame in a shot or another selected frame that is deemed to have more descriptive value of the shot. Such keyframe selection is disclosed in U.S. Pat. No. 6,125,229. A keyframe provides a snapshot of the video at a point in time.

The beginning and the end of segments of the shot where jerky motion has been detected are identified, such as by identifying the first and last frames or by identifying the time in the shot when the segment begins and when it ends, step 208.

The segments are then labeled with the type of jerky motion detected for that particular segment, step 210. Suitable labels include "SP" for "shaky pan", "UZI" for "uneven zoom in", "UZO" for "uneven zoom out", and "SSS" for "shaky static shot". Alternatively, a listing in a database table can include the start and end times of the segment along with an indication of the type of jerky motion detected within that segment.

Individual frames (or keyframes) of the identified segments with jerky motion are then displayed to the user on the display 108 with an identification as to the type of jerky motion that has been detected, step 212. Such identification can be with an appropriate alpha/numeric label (such as, SP, UZI, UZO, and SSS), or with a color code. Alternatively, keyframes of all segments, those with and those without detected jerky motion, can be displayed to the user so that the user can select what, if any, correction should be made to that segment.

The user can then agree with the determination of the jerky motion, select a different jerky motion selection, or choose that no jerky motion correction should be made, step 214. The segment is then appropriately corrected, if so instructed by the user, step 216, to substantially remove the jerky motion. The segment, as corrected (if so requested) is then added to the preceding portion of the video, step 218. Alternatively, the user can select which cuts should be combined and in which order by selecting with the input device 106 the appropriate displayed keyframes and perform non-linear operations using a drag-and-drop operation with the keyframes as representative of the corresponding segments. This is achieved by using a visualization tool displaying the keyframes. The reassembled video is then output to the display 108 and/or to the storage device 110. The process in FIG. 2 is continued until the input video has concluded or until the user instructs the process to cease. Alternatively, the corrected video segment can be stored in memory 104b or storage device 110 for future use, or added to a completely different video.

The keyframes of the various segments of each shot can be displayed to the user one at a time as the video is run forward, or all keyframes of each shot can be displayed to the user at the same time so that the user has an overall view of the shot. Alternatively, keyframes of more than one shot can be simultaneously displayed to the user.

Although, in the method described above, the video is initially broken up at shot changes, step 200, alternatively, the video may be broken up at predetermined time intervals or at other points. In yet another embodiment, the video need not be initially broken up at all, with jerky motion detection being performed, step 202, as the initial step.

Thus, while there have been shown and described and pointed out fundamental novel features of the present invention as applied to a preferred embodiment thereof, it will be understood that various omissions and substitutions and changes in the form and details of the devices described and illustrated, and in their operation, and of the methods described may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is the intention, therefore, to be limited only as indicated by the scope of the claims appended hereto.

What is claimed is:

1. A method for editing a source video signal comprising:
   receiving the source video signal;
   analyzing by a data processor of the source video to identify a shot in the source video signal, a shot in the source video being delimited as between two instances when a frame of the source video signal is substantially different from its immediately preceding frame;
   analyzing by a data processor of the shot to identify any jerky image motion during the shot;
   dividing the shot into a plurality of segments until each segment has only a single type of identified jerky motion;
   classifying by a data processor of the identified jerky motion as one of a plurality of types of jerky motion, one type being that there is no jerky motion; and
   stabilizing the classified shot taking into account the classified type of jerky motion, such stabilizing being sufficient to generate a corrected shot output video signal in which the jerky motion is substantially removed from the shot in the source video signal.

2. The method of claim 1, further comprising, prior to stabilizing the classified shot:
   generating an indication signal suitable for indicating to a user the type of jerky motion classified for the shot in the source video signal; and
   receiving a reclassification signal indicating that the user has reclassified the type of jerky motion for the shot in the source video signal;
   wherein the shot is stabilized taking into account the reclassified type of jerky motion for the shot.

3. The method of claim 2, further comprising:
   selecting a frame in the shot;
   generating a keyframe signal suitable for a display to display the frame thereon.

4. The method of claim 3, further comprising adding the corrected shot output video signal to another video signal.

5. The method of claim 4, wherein the other video signal is another corrected shot output video signal.

6. The method of claim 5, wherein the corrected shot output video signals are added to one another in an identical sequence as the shots appear in the source video.

7. The method of claim 5, wherein the corrected shot output video signals are added to one another in a sequence different than the shots appear in the source video.

8. The method of claim 5, wherein the corrected shot output video signals are added to one another in a desired sequence by the user dragging and dropping the frames of the corrected shots into the desired sequence on the display.

9. The method of claim 5, further comprising storing the added corrected shot output video signals onto a storage medium.

10. The method of claim 2, further comprising adding the corrected shot output video signal to another video signal.

11. The method of claim 10, wherein the other video signal is another corrected shot output video signal.

12. The method of claim 11, wherein the corrected shot output video signals are added to one another in an identical sequence as the shots appear in the source video.

13. The method of claim 11, wherein the corrected shot output video signals are added to one another in a sequence different than as the shots appear in the source video.

14. The method of claim 3, further comprising displaying the frame on a display employing the keyframe signal, wherein the indication signal is used by the display to display the type of jerky motion classified for the portion of the source video signal.

15. The method of claim 1, further comprising adding the corrected shot output video signal to another video signal.

16. The method of claim 1, further comprising, before stabilizing the classified shot, dividing the shot into a plurality of segments, each segment having a duration less than a predetermined threshold duration; and wherein said step of stabilizing the classified shot comprises stabilizing each segment.

17. An apparatus for editing a source video comprising:

receiving means for receiving the source video signal;

a processor for analyzing the source video to identify a shot in the source video signal, a shot in the source video being delimited as between two instances when a frame of the source video signal is substantially different from its immediately preceding frame, for analyzing the shot to identify any jerky image motion during the shot, for dividing the shot into a plurality of segments until each segment has only one identified type of jerky motion and for classifying the identified jerky motion as one of a plurality of types of jerky motion, one type being that there is no jerky motion, the processor generating a signal indicative of the classified type of jerky motion; and a video stabilizer receiving the classified shot and the signal indicative of the classified type of jerky motion, the video stabilizer employing the signal from the processor to stabilize the classified shot taking into account the classified type of jerky motion, such stabilizing being sufficient to generate a corrected shot output video signal in which the jerky motion is substantially removed from the shot in the source video signal.

18. The apparatus of claim 17, further comprising:

generating means receiving from the processor the signal indicative of classified type of jerky motion and for generating in response thereto an indication signal suitable for indicating to a user the type of jerky motion classified for the shot in the source video signal; and receiving means for receiving a reclassification signal indicating that the user has reclassified the type of jerky motion for the shot in the source video signal;

wherein the video stabilizer receives the reclassification signal and wherein the shot is stabilized taking into account the reclassified type of jerky motion for the shot.

19. The apparatus of claim 18, further comprising a keyframe selecting means for selecting a frame in shot in the received source video signal and for generating a keyframe signal suitable for a display to display the frame thereon.

20. The apparatus of claim 19, further comprising a display receiving the keyframe signal and suitable for displaying the frame thereon.

21. The apparatus of claim 18, further comprising means for dividing the shot into a plurality of segments, each segment having a duration less than a predetermined threshold duration; and wherein said video stabilizer stabilizes the classified shot by stabilizing each segment.

22. The apparatus of claim 17, further comprising means for dividing the shot into a plurality of segments, each segment having a duration less than a predetermined threshold duration; and wherein said video stabilizer stabilizes the classified shot by stabilizing each segment.

23. The apparatus of claim 17, further comprising a means for permitting a user to add the corrected shot output video signals in a desired sequence.

24. The apparatus of claim 23, further comprising a means for receiving and storing the added corrected shout output video signals.

* * * * *